United States Patent
Grott

(10) Patent No.: US 8,192,633 B2
(45) Date of Patent: Jun. 5, 2012

(54) METHODS OF ENERGY STORAGE AND TRANSFER

(76) Inventor: Gerald J. Grott, Phoenix, AZ (US)

( * ) Notice: Subject to any disclaimer, the term of this patent is extended or adjusted under 35 U.S.C. 154(b) by 759 days.

(21) Appl. No.: 11/978,891

(22) Filed: Oct. 30, 2007

(65) Prior Publication Data

US 2008/0128366 A1 Jun. 5, 2008

Related U.S. Application Data

(63) Continuation-in-part of application No. 10/706,341, filed on Nov. 11, 2003, now Pat. No. 7,353,634, which is a continuation-in-part of application No. 09/849,453, filed on May 4, 2001, now Pat. No. 6,651,383, which is a continuation-in-part of application No. 09/565,735, filed on May 5, 2000, now Pat. No. 6,374,539, which is a continuation-in-part of application No. 09/110,789, filed on Jul. 6, 1998, now Pat. No. 6,071,411.

(51) Int. Cl.
*C02F 1/00* (2006.01)

(52) U.S. Cl. ........................ 210/774; 210/767

(58) Field of Classification Search ............ 165/10, 165/58, 104.11, 104.19, 104.21; 210/655, 210/691, 767, 774; 47/58.1 R, 1.01 R
See application file for complete search history.

(56) References Cited

U.S. PATENT DOCUMENTS

| | | |
|---|---|---|
| 1,899,310 A | 2/1933 | Burnham |
| 1,947,248 A | 2/1934 | Burks, Jr. |
| 2,375,019 A | 5/1945 | Miller |
| 2,387,898 A | 10/1945 | Grebe et al. |
| 2,552,775 A | 5/1951 | Fischer et al. |
| 2,624,654 A | 1/1953 | Hirsch |
| 2,671,714 A | 3/1954 | McIlhenny et al. |
| 2,687,358 A | 8/1954 | Allberry et al. |
| 2,897,051 A | 7/1959 | McIlhenny et al. |
| 2,919,898 A | 1/1960 | Marwil et al. |
| 2,927,010 A | 3/1960 | Le Baron |
| 2,968,572 A | 1/1961 | Peeler, Jr. |
| 3,022,824 A | 2/1962 | Binkley et al. |
| 3,071,481 A | 1/1963 | Beach et al. |
| 3,077,054 A | 2/1963 | Niemeijer |
| 3,174,623 A | 3/1965 | Sloan |
| 3,224,867 A | 12/1965 | Milloch |
| 3,329,595 A | 7/1967 | Barbato et al. |

(Continued)

FOREIGN PATENT DOCUMENTS

JP 04-114988 A 4/1992
(Continued)

OTHER PUBLICATIONS

N.A. Wynhausen, Ion Exchange Regeneration for the Soft Water Service Industry, Reprinted from a series by Mr. Wynhausen, Published in "Water Condidtion and Purifcation Mag".

(Continued)

*Primary Examiner* — T. Nguyen
(74) *Attorney, Agent, or Firm* — Kenyon & Kenyon LLP

(57) ABSTRACT

Energy is stored and transferred by separating a sodium sulfate product from water containing sodium sulfate, adjusting the phase change temperature of the sodium sulfate product, storing energy in said product by heating the product above the sodium sulfate-sodium sulfate decahydrate phase change temperature and transferring the stored heat by cooling the heated sodium sulfate product to below said phase change temperature.

2 Claims, 5 Drawing Sheets

U.S. PATENT DOCUMENTS

| | | | |
|---|---|---|---|
| 3,331,207 A | | 7/1967 | McGrew et al. |
| 3,427,795 A | | 2/1969 | Howard et al. |
| 3,456,368 A | | 7/1969 | Jacques |
| 3,467,190 A | | 9/1969 | Townsend et al. |
| 3,490,241 A | | 1/1970 | Kuhn |
| 3,528,914 A | | 9/1970 | Darley |
| 3,578,432 A | | 5/1971 | Stiles |
| 3,617,554 A | * | 11/1971 | Thorborg ............... 210/664 |
| 3,627,479 A | | 12/1971 | Yee |
| 3,754,953 A | | 8/1973 | Martin |
| 3,826,311 A | | 7/1974 | Szabo et al. |
| 3,928,654 A | | 12/1975 | Bonnanzio |
| 4,159,944 A | | 7/1979 | Erickson et al. |
| 4,160,738 A | | 7/1979 | Guter |
| 4,161,446 A | | 7/1979 | Coillet |
| 4,179,347 A | | 12/1979 | Krause et al. |
| 4,230,244 A | | 10/1980 | Zissimopoulos |
| 4,233,960 A | * | 11/1980 | Johnson ............... 126/572 |
| 4,248,601 A | | 2/1981 | McGough et al. |
| 4,267,038 A | | 5/1981 | Thompson |
| 4,366,063 A | | 12/1982 | O'Connor |
| 4,422,940 A | | 12/1983 | Cousino et al. |
| 4,455,169 A | | 6/1984 | Chatterji et al. |
| 4,523,998 A | | 6/1985 | Kim |
| 4,525,202 A | | 6/1985 | Large et al. |
| 4,541,832 A | | 9/1985 | Vitellaro et al. |
| 4,592,931 A | | 6/1986 | Cargle |
| 4,828,726 A | | 5/1989 | Himes et al. |
| 4,857,202 A | | 8/1989 | McNulty |
| 4,996,065 A | | 2/1991 | Van de Walle |
| 5,039,439 A | | 8/1991 | Hansman, Jr. et al. |
| 5,121,708 A | | 6/1992 | Nuttle |
| 5,125,770 A | | 6/1992 | Hesseling et al. |
| 5,147,532 A | | 9/1992 | Leek, Jr. |
| 5,192,426 A | | 3/1993 | DeCoster et al. |
| 5,240,579 A | | 8/1993 | Kedem |
| 5,300,123 A | | 4/1994 | Grott |
| 5,304,365 A | | 4/1994 | Taborsky |
| 5,337,516 A | | 8/1994 | Hondulas |
| 5,472,291 A | | 12/1995 | Vogel |
| 5,491,157 A | | 2/1996 | Spadafora et al. |
| 5,589,603 A | | 12/1996 | Alexander et al. |
| 5,670,038 A | | 9/1997 | McKinney |
| 5,712,224 A | | 1/1998 | Boyd et al. |
| 5,853,262 A | | 12/1998 | Vogel |
| 5,858,240 A | | 1/1999 | Twardowski et al. |
| 5,972,689 A | | 10/1999 | Cook et al. |
| 6,063,736 A | | 5/2000 | Miryara et al. |
| 6,063,737 A | | 5/2000 | Haberman et al. |
| 6,071,411 A | | 6/2000 | Grott |
| 6,156,226 A | | 12/2000 | Klyosov et al. |
| 6,308,457 B1 | | 10/2001 | Howell |
| 6,374,539 B1 | | 4/2002 | Grott |
| 6,379,546 B1 | | 4/2002 | Braun |
| 6,391,202 B1 | | 5/2002 | Knobloch et al. |
| 6,651,383 B2 | | 11/2003 | Grott |
| 6,666,971 B2 | | 12/2003 | Chen |
| 6,733,654 B1 | | 5/2004 | Itzhak |
| 6,878,286 B2 | | 4/2005 | Jensen |
| 7,353,634 B2 | | 4/2008 | Grott |
| 7,455,109 B2 | | 11/2008 | Collins |
| 7,514,003 B2 | | 4/2009 | Grott |
| 7,622,044 B2 | | 11/2009 | Grott |
| 7,717,173 B2 | | 5/2010 | Grott |
| 7,771,600 B2 | | 8/2010 | Grott |
| 7,823,641 B2 | | 11/2010 | Grott |
| 7,866,916 B2 | | 1/2011 | Grott |
| 7,947,185 B2 | | 5/2011 | Grott |
| 2002/0108909 A1 | | 8/2002 | Hughes |
| 2002/0170816 A1 | | 11/2002 | Leffler et al. |
| 2003/0172697 A1 | | 9/2003 | Sower |

FOREIGN PATENT DOCUMENTS

| | | |
|---|---|---|
| WO | 9806483 A1 | 2/1998 |
| WO | 9823541 A1 | 6/1998 |

OTHER PUBLICATIONS

Minerva Canto, Wetlands to be Protected, The West, Printed Sep. 27, 2001. L.A. Times, Los Angeles, CA.

Ken Ellingwood, EPA to Rule on Imperial County's Dusty Air Quality, The State, L.A. Times, Nov. 1, 2001, Los Angeles, CA.

G.J. Grott,"Do-It-Yourself" Liquid Clorine Bleach for Rural Sanitation, Presented at the 3rd NFS International Symposium on Small Drinking Water and Wastewater Systems, Apr. 2001.

Edited by Rob M. Geertman, Changing Waste Irrigation Waters from Pollutant to Beneficial Products, 8th World Salt Symposium, vol. 1, 2000.

H. Clark Metcalfe, Modern Chemistry, 1986, p. 347-351, 2nd Addition, Holt McDougal.

Glossary of Terms Used in Physical Organic Chemistry (IUPAC Recommendations 1994), downloaded from web Jan. 22, 2003.

Environmental Help Line, Downloaded from web on Apr. 8, 2003.

Salinity, downloaded from web on Apr. 8, 2003.

Terry Plane, Salinity Threat to Drinking Water, Jan. 22, 2003, Downloaded from web on Apr. 8, 2003.

Bettina Boxall, Salton Sea Plan Proposed, L.A. Times News Paper, May 12, 2003. Los Angeles, CA.

B.D. Seeling (Soil Scientist), Salinity & Sodicity in North Dakota Soils, May 2003.

Thomas E. Huggler, Cannon's Guide to Freshwater Fishing with Downriggers, Nov. 1986.

J.R. Griffin, J.C. Silvertooth, E.R. Norton, Evaluation of Calcium Soil Conditioners in an Irrigated Cottong Production System, 1997, downloaded from web Mar. 31, 2000.

Bull et al., "Toxicological evaluation of risks associated with potable reuse of wastewater," 1981, Proceedings of the Water Reuse Symposium II: Washington, D.C., pp. 2176-2194.

Comprehensive Industry Document Series COINDS/24/1984-85, "Minimal National Standards Straight Nitrogenous Fertilizer Industry," Central Board for the Prevention and Control of Water Pollution, New Delhi, 60 pages.

Cooper, "Public health concerns in wastewater reuse," 1991, Water and Science Technology 24(9): 55-65.

Fleischman, Marvin, "Reuse of Wastewater Effluent as Cooling Tower Makeup Water," Univ. of Kentucky, Louisville KY, 1975, XP-001028672, pp. 501-514.

Lieberman, Lisa, "Recycled Wastewater Used to Irrigate Crops in California," The Vegetable Growers News, May 2003, Great American Publishing, 3 pages.

Maladinovic, N. et al., "Ammonia Removal from Saline Wastewater by Ion Exchange," Water, Air and Soil Pollution: Focus 4:169-177, 2004. Kluwer Academic Publishers, The Netherlands.

Maudru, J. E., "Ion Exchange in Beet Sugar Manufacture, Industrial and Engineering Chemistry" (1951), vol. 43:3, pp. 615-618.

McManus, Terrence J., P.E., Technical Consultant Betz-Converse-Murdoch-Inc., "Reuse of Agricultural Wastewater for Power Plant Cooling One-Year Pilot Plant Experience," XP-1030054, Jun. 24, 1979, pp. 441-454.

Schonbeck, Mark, "Does My Soil Need Cation Nutrients Balancing?, A Practical Guide to Nutrition for Soil Crops," Virginia Association for Biological Farming, downloaded from the web Sep. 27, 2004, 8 pages.

Skoog et al Fundamentals of Analytical Chemistry Holt Rinehart & Winston New York, N.Y. 1963 pp. 173-174, 185-186.

Wright, Robert A., (Ed.), The Reclamation of Disturbed Arid Lands, Univ. of New Mexico Press, Alburquerque, 1978, p. 40.

"Saline Water" retrived Feb. 24, 2011 from http://en.wikipedia.org/wiki/Saline_water 3 pages.

* cited by examiner

METHODS OF ENERGY STORAGE AND TRANSFER

RELATED APPLICATIONS

This application is a continuation-in-part of my application U.S. Ser. No. 10/706,341 filed Nov. 11, 2003 now U.S. Pat. No. 7,353,634, which is, in turn, a continuation-in-part of my application U.S. Ser. No. 09/849,453, filed May 4, 2001, now U.S. Pat. No. 6,651,383 issued Nov. 25, 2003, which is, in turn, a continuation-in-part of my application U.S. Ser. No. 09/565,735 filed May 5, 2000, now U.S. Pat. No. 6,374,539 issued Apr. 23, 2002, which is in turn, a continuation-in-part of my application U.S. Ser. No. 09/110,789 filed Jul. 6, 1998, now U.S. Pat. No. 6,071,411 issued Jun. 6, 2000.

FIELD OF THE INVENTION

The present invention relates to methods of energy storage and transfer.

More particularly, the invention relates to the use of a sodium sulfate product for storing and transferring energy.

In yet another aspect the invention concerns use of a sodium sulfate product, derived from otherwise useless or harmful waste waters, as a medium for storage and/or transfer of energy, thus to provide the economic basis for the treatment of the waste waters by water purification and reuse thereof for valuable purposes, as the alternate to expensive or ineffectual waste water disposal.

These and other, further and more specific objects and advantages of the invention will be apparent to those skilled in the art from the following detailed description taken in conjunction with the drawings, in which:

BACKGROUND OF THE INVENTION

Figure 1:
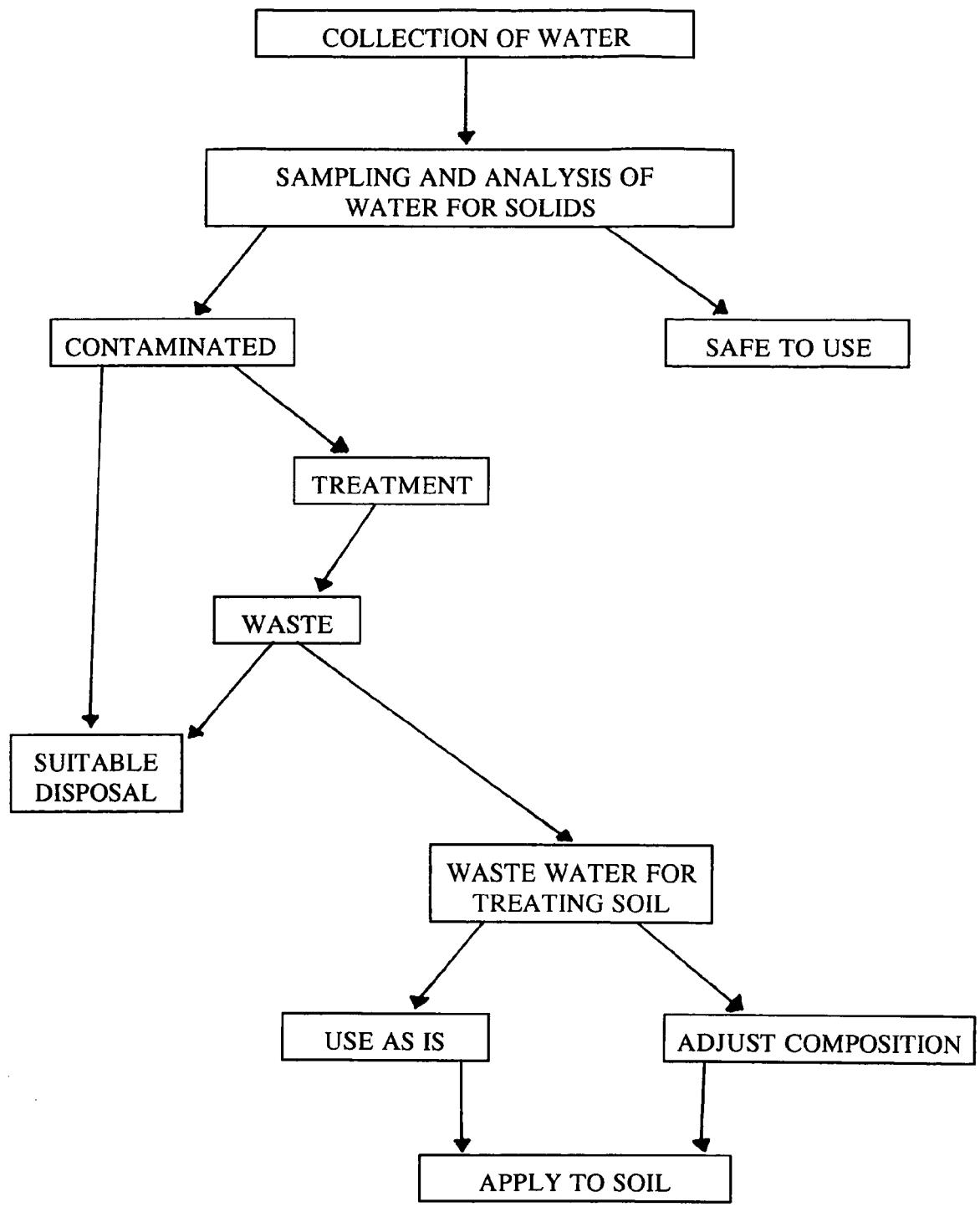
FIG. 1 is a flow chart of the preferred method of the invention for initial refining of waste waters to separate and provide a clean water stream and a contaminated water stream.

Water purification typically produces a first effluent of relatively "clean water" and a second effluent of "waste water" which includes unwanted contaminants.

For example, the softening of hard water by the removal of calcium and magnesium is required for both industrial and household use. Known water softening processes proceed either by way of ion-exchange, membrane softening or precipitation. In the ion-exchange processes, the calcium (Ca++) and magnesium (Mg+) ions are exchanged for sodium (Na+) ions. Regeneration of the ion-exchange resin is achieved with a large excess of NaCl. This process creates a regeneration effluent being a relatively concentrated aqueous solution of sodium, calcium and magnesium chlorides. Consequently, by this method, considerable amounts of sodium, calcium and magnesium salts in solution must be disposed of.

Alternatively, it is possible to use weak acid resins which exchange hydrogen (H+) for calcium (Ca++) and magnesium (Mg++) ions, and to regenerate the spent resins with a mineral acid. While this method creates less waste water, it is more expensive and yields relatively acidic soft water which is corrosive.

Membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This results in waste water which is difficult to filter and requires use of cumbersome equipment.

The disposal of waste water has become an expensive problem for society. For example, approximately 1.61 billion gallons of waste water containing approximately 800,000 tons of mixed sodium, calcium, magnesium chlorides and sulfates is produced from water treatment operations and oil fields in the state of California alone. Disposal of this waste water costs millions of dollars each year.

It would be desirable for such waste waters to be processed so as to provide valuable products which could then be sold and used to offset the disposal costs.

BRIEF DESCRIPTION OF THE INVENTION

Briefly, in accordance with the invention, I provide methods for economically and efficiently using waste waters produced by water purification and particularly those produced from oil and gas wells, and irrigation drainage, by processing such waters to recover a valuable sodium sulfate product that provides economical energy storage and transfer. The economic value of the sodium sulfate product is sufficient to cover the cost of processing the waste waters and ultimate disposal of unusable byproducts.

According to one embodiment of the invention, I provide a method for energy storage and transfer using the phase change energy of sodium sulfate and sodium sulfate decahydrate. The method comprises, in combination the steps of (a) separating a sodium sulfate product, from water containing sodium sulfate dissolved therein and other containing contaminate salts, (b) adjusting the phase change temperature of the separated sodium sulfate to a preselected temperature by regulating the amount of the contaminate salts in the sodium sulfate product, and (c) storing energy in the product by heating the product to above the preselected phase change temperature, producing a heated sodium sulfate product; and transferring energy from the heated sodium sulfate by cooling the heated sodium sulfate product to below the selected phase change temperature.

In another and presently preferred embodiment, I provide a method for energy storage and transfer using the phase change energy of sodium sulfate and sodium sulfate decahydrate, comprising, in combination, the steps of (a) separating a sodium sulfate product from the waste water of a water purification process which contains sodium sulfate and other contaminate salts dissolved therein; (b) adjusting the phase change temperature of the separated sodium sulfate to a preselected temperature by regulating the amount of the contaminate salts in the sodium sulfate product; (c) storing energy in the product by heating the product to above the preselected phase change temperature, producing a heated sodium sulfate product; and (d) transferring energy from the heated sodium sulfate by cooling it to below the selected phase change temperature.

As defined herein, clean water refers to water which has been treated by one or several methods for public or industrial use. For example, in the drinking water industry, clean water is the final delivered water. Typical water purification processes and water softening processes create waste water having various levels of salt content. For the purposes of this invention, I define "waste water" as water containing about 0.15% or more by weight of the salts of Na, K, Ca, Mg, Fe, Cl, SO4, and CO3 or a combination thereof.

DETAILED DESCRIPTION OF THE PREFERRED EMBODIMENTS

Water softening is the removal of the "hardness" from the water which means predominantly removing or altering the calcium and magnesium ions from the water. These calcium and magnesium ions combine with carbonates, sulfates, oils and fat to create bathtub scum, spotted dishes, gray sheets, etc. In addition, unsoftened water causes scaling in water heaters and boilers, causing early substantial energy losses through impaired heat transfer and early shutdown for the removal of scale.

Several methods for effecting water softening are known. The best known process for softening water is "ion-exchange." Ion-exchange entails the exchange of sodium, which is introduced into water, for calcium, magnesium, iron and other divalent mineral ions which are transferred out of the water and into a resin. When the resin approaches saturation with these "hard" ions, the resin is regenerated, most often with solutions of sodium chloride, leaving an effluent containing 3 to 25% sodium, calcium and magnesium salts which must be disposed of.

The exact concentration of the effluent depends on the shop practice and, in particular, on the amount of rinse water included in the effluent, if any. Less often, mineral acids like sulfuric acid or hydrochloric acid are used for water softening and these also produce effluents. Conversely, reverse water softening also involves ion exchange in which calcium and magnesium are introduced into the water to separate sodium.

Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

As shown in FIG. 1, each of these water purifying processes produce a clean water effluent and a waste water effluent which is expensive and difficult to dispose of, contaminated with salts including Na, K, Ca, Mg, Fe, Cl, SO4 and CO3. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising an aqueous solution of salts, is analyzed for individual amounts of sodium, calcium, and magnesium and total dissolved solids.

Figure 2:
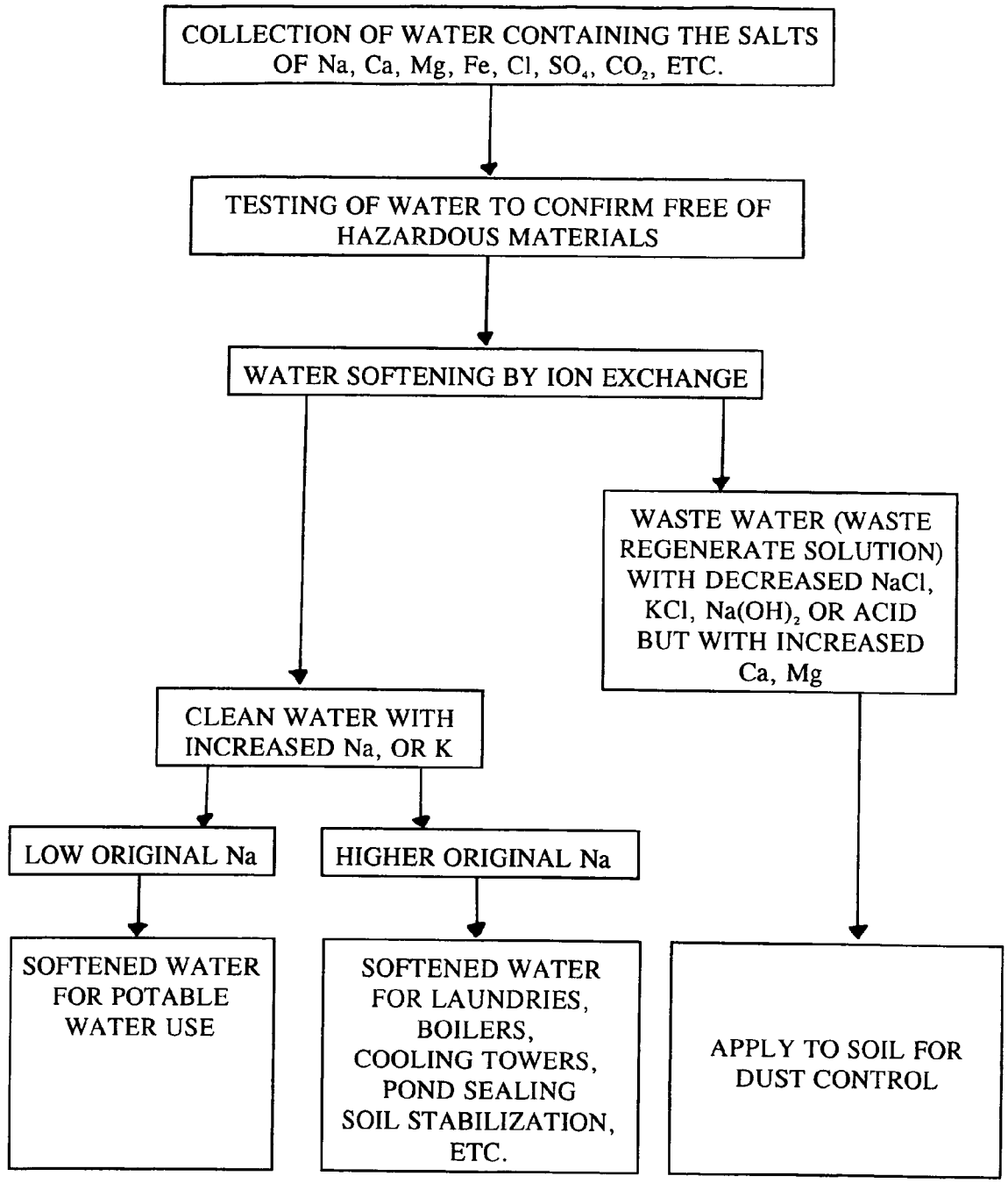
FIG. 2 is a flow chart of another preferred method of the invention for initial refining of waste waters to separate and provide a clean water stream and a contaminated water stream.

With reference to FIG. 2, in a second preferred embodiment, water is collected which is contaminated with the salts of Na, Ca, Mg, Fe, Cl, SO4, and CO3. The water is then tested to confirm that it is free of hazardous materials. The contaminated water is then purified by ion exchange. As the name implies, the amount of salts in the effluents does not change. However, the cations are exchanged. By this process, a first effluent of clean water is produced having increased sodium or potassium. Where the contaminated water originally contained a low amount of sodium, it is preferred that this water be used for potable water. Where the contaminated water originally contained high sodium amounts, it is preferred that the clean water effluent be used for laundries, boilers, cooling towers, pond sealing and soil stabilization. These applications are typically more tolerant of waters having high sodium content, as long as the magnesium and calcium content remains low. These uses are listed in order of suitability as the sodium increases.

Figure 3:
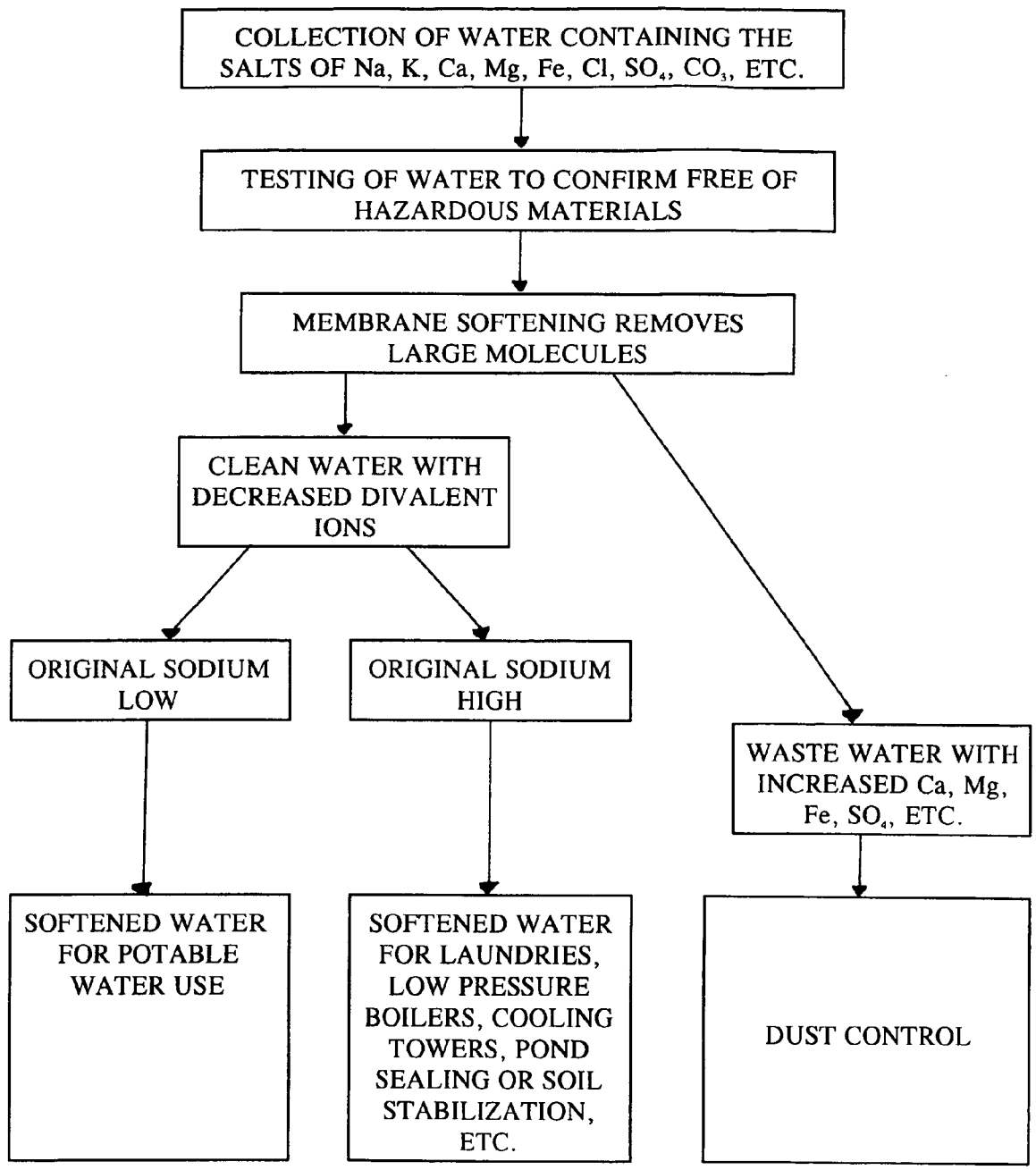
FIG. 3 is a flow chart of still another preferred method of the invention for initial refining of waste waters to separate and provide a clean water stream and a contaminated water stream.

With reference to FIG. 3, in a third preferred embodiment, water is collected which is contaminated with the salts of Na, K, Ca, Mg, Fe, Cl, SO4, and CO3. The water is then tested to confirm that it is free of hazardous materials. This contaminated water is then purified by a membrane system to remove large molecules. A first effluent of clean water having decreased multivalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having significant calcium, magnesium, iron, sulfates, etc.

Figure 4:
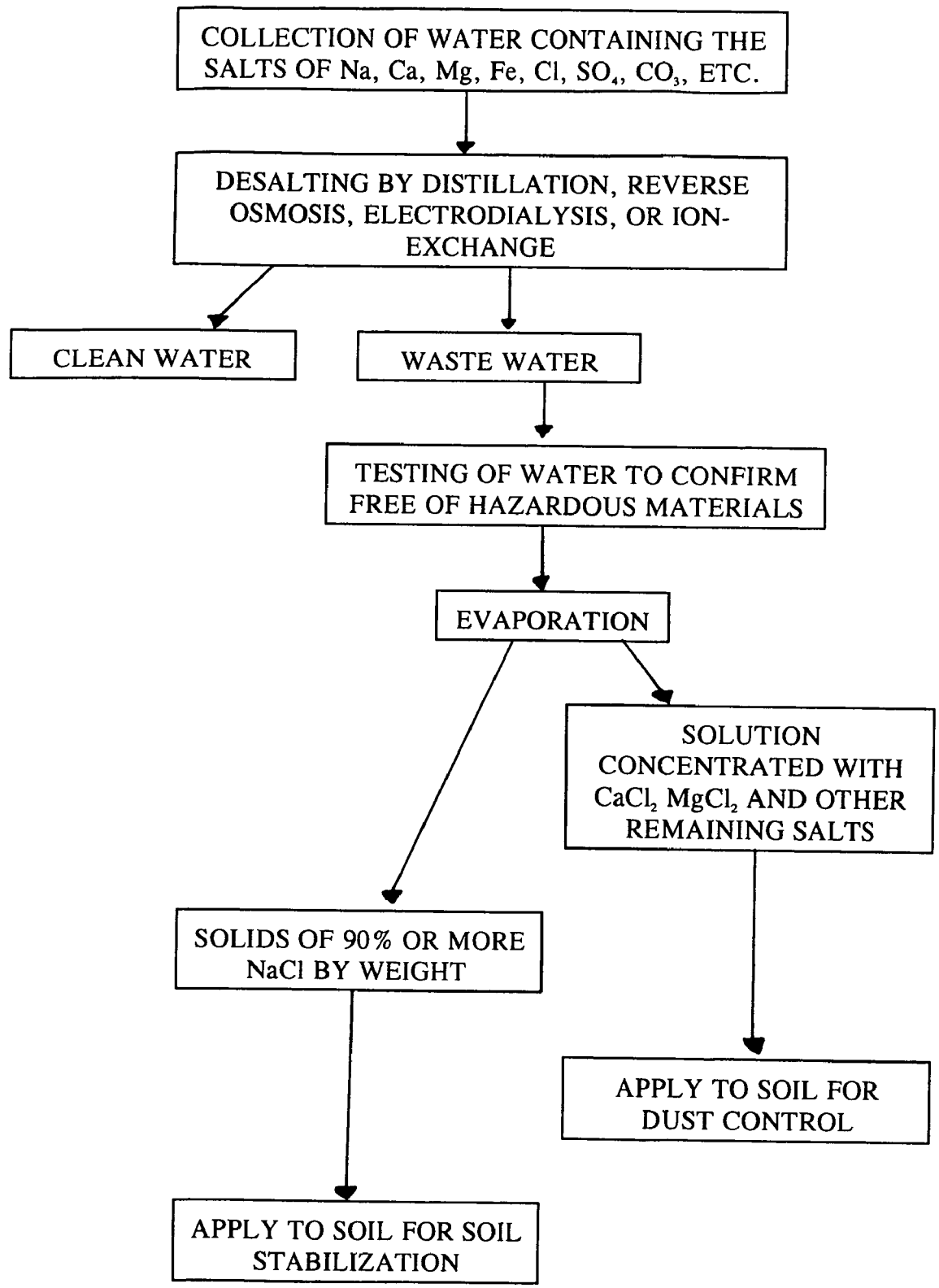
FIG. 4 is a flow chart of a preferred method of the present invention including evaporation to produce substantially solid sodium sulfate product.

With reference to FIG. 4, in a fourth preferred embodiment of the present invention, water is collected which is contaminated with the salts of Na, K, Ca, Mg, Fe, Cl, SO4, and/or CO3. The contaminated water is then tested to determine that it is free of hazardous chemicals, and if the water is determined to be sufficiently free of hazardous chemicals, the water is purified by water softening, such as by ion exchange. As shown, ion exchange produces a first effluent of clean water which typically has a high sodium content. As explained with reference to FIG. 2, where the clean water has a low sodium content such as where the original contaminated water had a low sodium content, the water may be used for potable applications. Meanwhile, where the clean water has a high sodium content, the clean water may used for laundry applications, cooling towers, pond sealing and soil stabilization.

Figure 5:
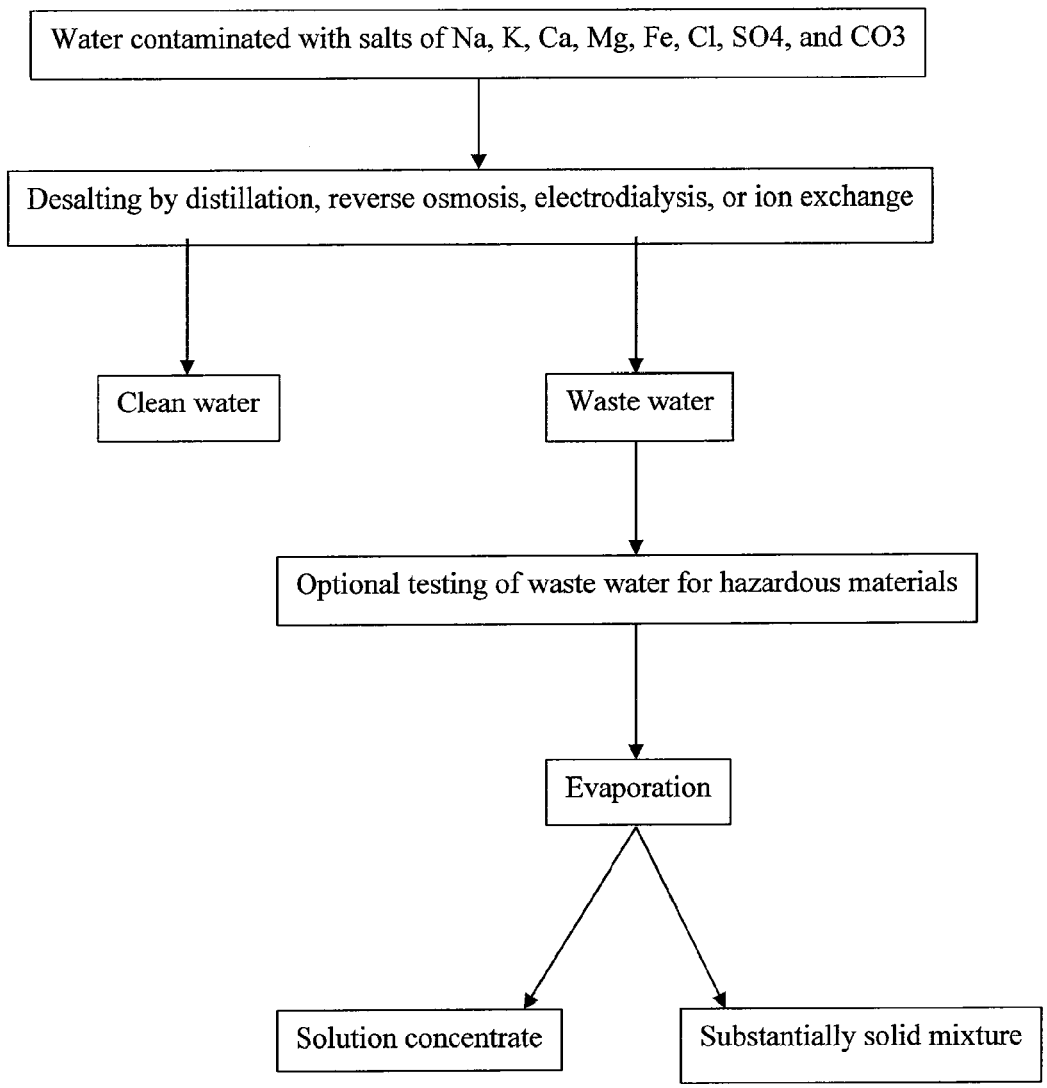
FIG. 5 is a flow chart of a preferred method of the present invention including desalting contaminated water to obtain clean water and waste water, and evaporating the waste water to obtain a substantially solid mixture.

With reference to FIG. 5, for practicing the presently preferred embodiment of the present invention, water that is contaminated with the salts of Na, K, Ca, Mg, Fe, Cl, SO4, and CO3 is desalted by distillation, reverse osmosis, electrodialysis or ion exchange to produce a first effluent of clean water and a second effluent of waste water. The waste water is preferably tested to ensure that it is free of hazardous materials. In a preferred practice of the present invention, the water undergoes evaporation to produce a substantially solid mixture and a solution concentrate. The substantially solid mixture is comprised primarily of sodium salts, in particular sodium sulfate.

Salty Irrigation Drainage

Irrigation water contains salts and some inorganic fertilizer materials that are used by plants in varying degrees but rarely, if ever, in their entirety. Plants separate water and nutrients selectively for growth and for temperature regulation by evapo-transpiration. Some water is evaporated at the soil surface leaving the salts behind. The remaining water becomes salty, and, if not flushed out of the root zone, reduces the crop yield. The continued pumping of ground water can recirculate the salts until their concentration makes agriculture uneconomical.

Where the irrigation water is from a source other than local groundwater, the downward percolating irrigation water causes the local water table to rise. When the water table nears the surface, say to about 6 feet or less, the salty water can migrate upwards reducing crop yield and eventually covering the surface with salts. These once productive lands become barren.

Waste-waters high in sulfate are also produced in geothermal operation and from other natural sources. While this discussion is stated mostly in terms of irrigation drainage, persons skilled in the art will recognize that the work herein described is applicable to these other sulfate waste or by-product waters.

Some of the methods for recovering products from irrigation drainage differ from those used for recovering salts from chlorides type wastes. Additionally, the products themselves vary according to the amounts of each salt in the wastes, and of course, the carbonate and sulfate products increase the number of uses of salts recovered from wastes. One factor contributing to the need for processing and recovering valuable products from irrigation drainage is the high volume of such waters, their widespread occurrence, and the rapid growth in their volume that endangers sustainable agriculture.

There are many uses for salts that do not require the purity of the grades of commerce now in general use. This allows the preparation of usable grades at minimum cost and the even lower costs again serve to broaden the fields of economic use.

EXAMPLE A

The Imperial Valley area in which the Salton Sea lies was once part of the Sea of Cortez. It was cut off by the spreading delta of the Colorado River and dried up become a large depression. Flooding of the lowest part started with a canal breaking in 1908. Irrigation drainage and other inflow has increased the surface area of the Salton Sea (SS) to 381 square miles (98,700 hectares) at an elevation of 227 feet (69 meters) below sea level (1).

Tests were run so as to duplicate, on a reduced scale, the typical solar practice of two or more evaporation stages, in series, to get best evaporation efficiency. Evaporation was carried out in duplicate pans 33 cm×63 cm×10 cm deep, lined with polyethylene film. Daily ambient highs were 38-42° C. and night lows were 15° to 17° C. Daytime relative humidity was 15 to 25%. The specific gravity (sg) of the Salton Sea water was 1.03.

On the second day of evaporation (sg 1.047) white flakes were forming with many floating on the brine surface. By morning of the third day, at (sg 1.057), the flakes formed an almost continuous covering. The evaporation rate varied between 0.9 and 1.2 centimeters per day until the specific gravity was at 1.145 and the floating crystals, now including other salts, formed a thick continuous (surface) skin. Before the skin formation the brine temperature was 30° C. After a continuous skin formed on the surface the brine temperatures were as high as 48 C°. Evaporation was continued to sg 1.22.

One liter of the remaining brine (sg 1.342) was further evaporated outdoors until a level slightly above 520 ml. total of brine and settled salts was reached. Some of the precipitated salts had adhered to the glass above the brine level and are not included in this volume. The brine was drained and 480 ml. was recovered at sg 1.293. Despite the evaporation of over half of the water, the precipitation of the salts due to temperature changes had lowered the specific gravity of the brine.

The 480 ml portion was divided into 100 ml. and 380 ml. splits. The 100 ml was transferred to a 200 ml beaker, which was then sealed with plastic wrap to avoid evaporation. It was then cooled by refrigeration in a compartment at 4.4° C. The wrap was removed only for as long as it took to measure temperature with a thermometer that was also kept in the refrigerator. The first precipitation of fine crystals was noted at 14° C. Cooling was continued overnight in an iced compartment. The morning temperature was 2.2 C. The fine precipitate had caked at about 45% of the total volume. A stirring spatula was used to break the cake into fine particles, which were allowed to settle. The settled level was about 40% of the total volume. The liquid was drained and the wet solids were heated in a microwave oven for 3 to 5 second intervals to avoid overheating and evaporation.

Brine hardness was measured using a Hack Kit 5B and the procedure used for checking brines used in water softening. The brine hardness was 1020 grains calculated as calcium carbonate. [0115] The 380 ml split was placed into a ceramic bowl, sealed with a thin clinging plastic wrap, and put out to chill overnight. The air temperature was 14° C. at midnight and 10° C. at 6:10 AM. The sample temperature was 9.5° C. The volume had not measurably decreased, so the indication is that the night low was cooler than the 6:10 AM temperature.

The brine in the bowl remained very clear and appeared to be unchanged but, on examination, it was found to contain many crystal clear acicular crystals 4 to 6 cm. long. These were removed with a stainless steel table fork, drained, weighed, and then placed on filter paper for blotting some of the adhering brine. The blotting removed an additional 3.5 grams of brine. The drained and blotted weight was 58.1 grams and the sg of the remaining brine was 1.254 (60° F.).

Forty grams of these crystals were placed in a 125 ml sample bottle and heated in the microwave for short increments to initiate melting. The "hold temperature" was measured, the liquid was then drained from the bottle, and a hardness measurement was made on the drained liquid. Four cycles were completed. Each time the hold temperature was 27.7° C. (81.9° F.). The hardness equivalents of the melts were 1320, 2100, 1500, and 1500 respectively. This sodium sulfate, containing about 2-3% of magnesium salt and minor amounts of other salts, functions well for heat storage, and the phase change point lies within the optimum range for raising chickens, for example, and also, for example, for use in aquaculture, as in raising tilapia.

ENERGY STORAGE AND TRANSFER

It is common knowledge that one may change the amounts of salts in a mix with sodium sulfate in order to control the temperature at which the phase change occurs. For example, it is possible to lower the temperature at which the phase change occurs down to about 65° F. using sodium chloride alone. This ability to make these mixtures is well known to those skilled in this art. In this case the complete mix is made from salts recovered from wastes.

Also well known are the methods for separation of the magnesium, and other salts, from the sodium sulfate. The magnesium may be separated by adding lime or hydrated lime. The precipitated magnesium oxide, or hydroxide, is particularly suitable for use in neutralizing minerals in acidic solutions because the precipitate settles well.

Sodium sulfate decahydrate is the most widely studied material for storing phase change energy, because it is effective at temperatures within our daily experience, say from refrigeration at 4° C. to warm water at 31° C. Uses extend from filling water bottles to keep ones feet warm to heating entire living and working spaces. Using the phase change at 241° C., the sodium sulfate product obtained from solar evaporation, is useful even for refrigeration according to the cycle used for refrigeration by burning propane.

Thus, it is possible to produce sodium sulfate recovered from irrigation drainage and similar salty wastewaters, to the purity commonly used for heat storage and energy conservation. Additionally, I have found that it is not necessary to have the high purity sodium sulfate used by others for energy storage.

I have found usable heat storage properties in mixed salts as recovered from irrigation drainage by evaporation. I have found other usable mixes where these salts are only partially separated by the use of ambient cooling and/or heating, and no fossil energy is required other than that used for materials size control, handling and transport.

These low-cost salts are ideally suited for massive energy storage for agricultural uses. It is well known that different plants and animals grow best at some discrete range of temperature suited to their species. An abundance of low cost sodium sulfate allows the use of stored solar heat to heat the living space of plants and animals at night. It also allows the use of nighttime cooling and the cooled sulfate may be used in cooling the living space in the daytime for plants, animals, and for humans.

Pure anhydrous sodium sulfate also undergoes a phase change at 241° C. with the absorption of 27 BTU/lb (15 cal./gm.) of material. I have found that considerable amounts of other salts may be tolerated while retaining much of the value for heat storage.

Using pellets of the anhydrous material recovered from wastes makes it more economical to store solar energy or to transfer waste heat, from flue gases for example, at the very usable 241° C. Storage of heat at this temperature is suitable for refrigeration.

Thus it is demonstrated that heat storage products of great utility can be prepared using materials recovered from common wastes, and with a minimum expenditure of energy for processing.

EXAMPLE B

Drainage from Southern San Joaquin Valley: Salt samples and a residual brine sample were taken directly from one of several solar evaporation ponds totaling about 80 acres. Before being shut down, the ponds had been used for about 15 years to evaporate irrigation drainage. Mitigation requires salts removal and land reclamation.

Analysis of five (5) previous samples of salts from these ponds, as provided by California Dept. Of Water Resources (DWR), shows sulfate ion contents of about ⅔ of all ions in the analysis, other than water. Analysis of one sample was approximately 85% sodium sulfate, 11% calcium sulfate, 2% magnesium sulfate, 1.6% sodium chloride with 0.6% as potassium and boron compounds (dry basis). It is presumed that rainfall leached much of the sodium chloride from the salts after the ponds were drained.

A sample was dissolved to make a saturated brine. The brine was chilled to 38° F., well within the range reached by outdoor spray chilling in winter. The crystallized hydrates were found to have a phase change from hydrate to melt at 82° F., just as did the hydrates recovered from the Salton Sea by solar evaporation and chilling outdoors.

A sample of the residual brine from that pond was chilled to below 32° F. without crystallizing any hydrates. On chilling to below 22° F., there was some precipitation of what is believed to be sodium di-hydrite, a compound known to form from sodium chloride brine at 22° F. This remnant brine is very suitable for use as a liquid for heat transfer in refrigeration.

Having described my invention in such terms as to enable one skilled in the art to understand and practice it and, having identified the presently preferred embodiments thereof, I claim:

1. A method for energy storage and transfer using the phase change energy of sodium sulfate and sodium sulfate decahydrate, comprising, in combination, the steps of:
    (a) separating a sodium sulfate product from water containing sodium sulfate dissolved therein and contaminate salts other than sodium sulfate, said sodium sulfate product containing sodium sulfate and the contaminate salts other than sodium sulfate,
    wherein the phase change temperature of the sodium sulfate in said sodium sulfate product is adjusted to a preselected temperature by regulating the amount of said contaminate salts other than sodium sulfate in said sodium sulfate product;
    (b) storing energy in said sodium sulfate product by heating said sodium sulfate product to above said preselected temperature, producing a heated sodium sulfate product; and
    (c) transferring energy from said heated sodium sulfate product by cooling said heated sodium sulfate product to below said preselected temperature.

2. A method for energy storage and transfer using the phase change energy of sodium sulfate and sodium sulfate decahydrate, comprising, in combination, the steps of:
    (a) separating a sodium sulfate product from the waste water of a water purification processes of water containing sodium sulfate and other contaminate salts dissolved therein, wherein said sodium sulfate product comprises sodium sulfate and said other contaminate salts, and
    wherein the phase change temperature of the sodium sulfate in said sodium sulfate product is adjusted to a preselected temperature by regulating the amount of said other contaminate salts in said sodium sulfate product;
    (b) storing energy in said sodium sulfate product by heating said sodium sulfate product to above said preselected temperature, producing a heated sodium sulfate product; and
    (c) transferring energy from said heated sodium sulfate product by cooling said heated sodium sulfate product to below said preselected temperature.

* * * * *